United States Patent
Werley et al.

(10) Patent No.: US 10,109,834 B2
(45) Date of Patent: Oct. 23, 2018

(54) MODIFIED U-TAB FOR ACCOMMODATING INDETERMINATE BATTERY TAB LOCATIONS

(71) Applicant: Apple Inc., Cupertino, CA (US)

(72) Inventors: Charles W. Werley, Bethlehem, PA (US); Vijayasekaran Boovaragavan, Cupertino, CA (US); Angelo V. Marasco, Sunnyvale, CA (US); Thai T. Ton, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 15/423,165

(22) Filed: Feb. 2, 2017

(65) Prior Publication Data
US 2018/0090733 A1 Mar. 29, 2018

Related U.S. Application Data

(60) Provisional application No. 62/399,154, filed on Sep. 23, 2016.

(51) Int. Cl.
*H01M 2/20* (2006.01)

(52) U.S. Cl.
CPC .......... *H01M 2/20* (2013.01); *H01M 2220/30* (2013.01)

(58) Field of Classification Search
CPC ................................. H01M 2/20; H01M 2/30
See application file for complete search history.

(56) References Cited

U.S. PATENT DOCUMENTS

| | | | |
|---|---|---|---|
| 9,130,224 | B2 | 9/2015 | Lee |
| 2010/0055560 | A1 | 3/2010 | Jang |
| 2011/0052969 | A1 | 3/2011 | Cai |
| 2013/0171485 | A1 | 7/2013 | Kodera |

OTHER PUBLICATIONS

Massey, Steve, "Ultrasonic Metal Welding for Lithium-Ion Battery Cells," EWI, Jan. 17, 2013, [retrieved from the internet] URL: https://ewi.org/ultrasonic-metal-welding-for-lithium-ion-battery-cells/ [retrieved from the internet].

*Primary Examiner* — Olatunji A Godo
(74) *Attorney, Agent, or Firm* — Blank Rome LLP

(57) ABSTRACT

Battery assemblies, as well as methods and processes for forming same. A battery assembly can include a first tab electrically connected to a first terminal of a battery and a second tab electrically connected to a second terminal of the battery. A battery assembly can also include a first conductive path (aka first section) having a first end, and a second conductive path (aka second section) having a second end. Another end of the first conductive path can be coupled an electronic device, such as an electric circuit. Another end of the second conductive path can be coupled to the electronic device as well. A space separates the first and second ends; the space formed by removing at least one portion of a U-shaped conductive path. The first conductive path and the first battery tab are connected. The second conductive path and the second battery tab are also connected.

24 Claims, 25 Drawing Sheets

260

261 Obtain Battery Having First Tab Connected to First Terminal and Second Tab Connected to Second Terminal

262 Obtain U-shaped conductive path

263 Determine Position of First Tab and Position of Second Tab

264 Remove First Portion of U-shaped Conductive Path along Line a First Distance from Inner Side of First Tab to Partition U-shaped Conductive Path into First and Second Sections

265 Remove Second Portion of U-shaped Conductive Path along Line a Second Distance from Inner Side of Second Tab

266 Connect First Section to First Tab

267 Connect Second Section to Second Tab

Determining a position of a first tab connected to a first terminal of a battery
321

Determining a position of a second tab connected to a second terminal of the battery
322

Dissecting a U-shaped conductive path into a first section and a second section by removing a first portion of the U-shaped conductive path
323

Connecting First Section to First Tab
324

Connecting Second Section to Second Tab
325

```
┌─────────────────────────────────────┐
│ Determining a position of a first tab connected │
│ to a first terminal of a battery    │
│                              341    │
└─────────────────────────────────────┘
                 │
                 ▼
┌─────────────────────────────────────┐
│ Determining a position of a second tab │
│ connected to a second terminal of the battery │
│                              342    │
└─────────────────────────────────────┘
                 │
                 ▼
┌─────────────────────────────────────┐
│ Dissecting a U-shaped conductive path into │
│ a first section and a second section by │
│ removing first and second portions based on │
│ determined positions         343    │
└─────────────────────────────────────┘
                 │
                 ▼
┌─────────────────────────────────────┐
│ Connecting First Section to First Tab │
│                              344    │
└─────────────────────────────────────┘
                 │
                 ▼
┌─────────────────────────────────────┐
│ Connecting Second Section to Second Tab │
│                              345    │
└─────────────────────────────────────┘
```

FIG. 25

MODIFIED U-TAB FOR ACCOMMODATING INDETERMINATE BATTERY TAB LOCATIONS

CROSS-REFERENCE TO RELATED APPLICATION

This application claims priority to U.S. Provisional Application No. 62/399,154, filed on Sep. 23, 2016, which is fully incorporated by reference herein.

TECHNICAL FIELD

This disclosure relates generally to connectors for connecting electronic components to batteries, and, in particular, to connectors that can accommodate variances in placement of connective tabs of batteries due to, e.g., manufacturing tolerances.

BACKGROUND

Some batteries employed in portable electronic devices employ so-called battery tabs connected to the terminals (i.e., the positive and negative terminals) of the battery. These tabs facilitate connection of the battery to the electronic components of the device. The connective tabs of a battery are spatially separated from one another to prevent short circuiting of the battery. Sometimes, the electronic devices to which the battery is to be connected, such as a printed circuit board (PCB) assembly, will employ connectors that are in some respects similar to the battery tabs. Such connectors may be similarly separated to prevent short circuiting. Due to manufacturing tolerances, the exact location of a battery's connective tabs may vary from battery to battery. In some cases, device-side connectors are designed so that the spacing between connectors (e.g., between a positive and negative connector) will accommodate battery manufacturing tolerances, to ensure proper connection between device-side and battery-side connectors. This can cause the device-side connectors (and the overall battery-to-device connection) to have larger than necessary footprints, which can take up valuable space in a portable electronic device.

SUMMARY

Disclosed herein are various connector embodiments to connect electronic components, such as printed circuit boards, to battery tabs, as well as methods for forming such connections. The connectors can be fashioned from a single U-shaped piece of conductive material by creating a gap in the U-shaped piece of conductive material.

BRIEF DESCRIPTION OF THE DRAWINGS

Implementations of the present application will now be described, by way of example only, with reference to the attached figures, wherein:

FIG. 17 illustrates a method of forming a battery assembly according to some embodiments;

FIG. 23 illustrates a process by which a battery assembly can be formed according to some embodiments;

FIG. 25 illustrates a process by which a battery assembly can be formed according to some embodiments.

DETAILED DESCRIPTION

Various embodiments of the disclosed concepts are described below with reference to the figures. The descriptions are examples and not limitation. Throughout this disclosure, the phrases "first conductive path" and "second conductive path" are synonymous with the phrases "first section of a U-shaped conductive path" (or simply "first section") and "second section of a U-shaped conductive path" (or simply "second section"), respectively.

Figure 1:
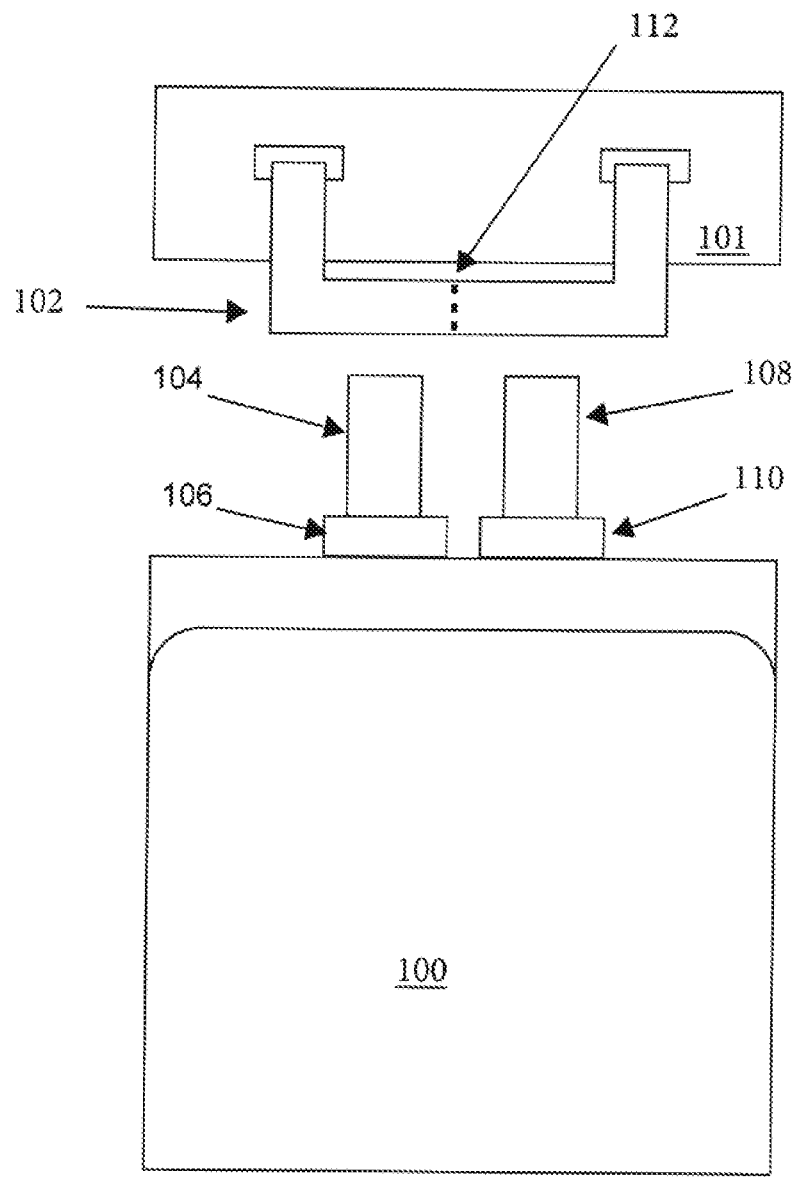
FIG. 1 illustrates components that can be utilized to form a battery assembly.

FIG. 1 illustrates components that can be utilized to form a battery assembly. A U-shaped conductive path 102 is shown above a battery 100. The U-shaped conductive path 102 is coupled to electronic device 101. The electronic device can be a circuit, circuit component, printed circuit board, or the like. The battery 100 has a first tab 104 electrically connected to its first terminal 106. The battery 100 also has a second tab 108 electrically connected to its second terminal 110.

In some embodiments, the position of the first tab 104 and the position of the second tab 108—which can vary from battery to battery due to manufacturing tolerances—are determined. A machine vision system (not shown) or other type of industrial locating and positioning system can be used to determine positions of the tabs 104, 108. With the positions of the tabs 104, 108 determined, the U-shaped conductive path 102 can be partitioned into a first section and a second section. Partitioning may be done by removing a first portion 112.

Figure 2:
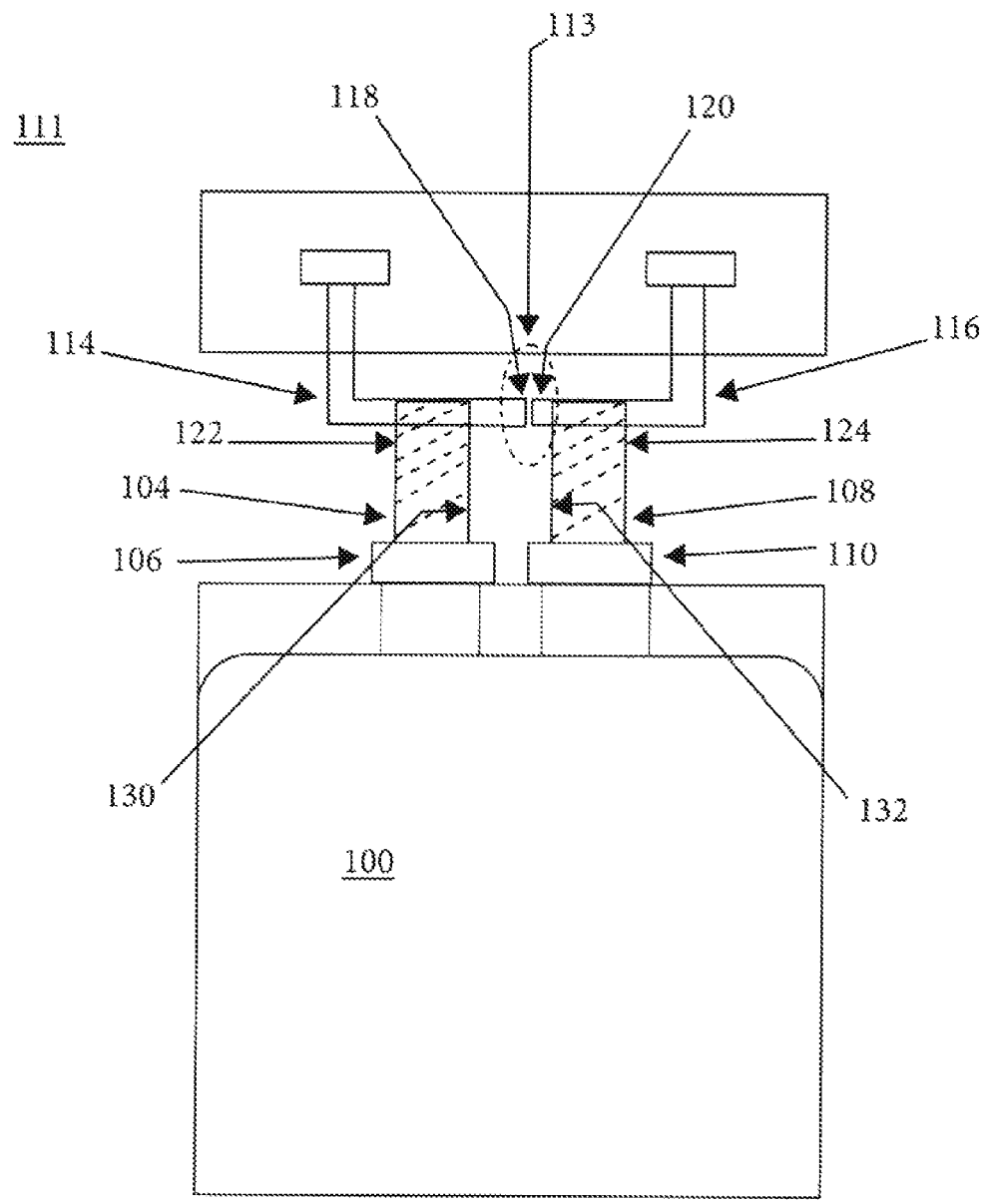
FIG. 2 illustrates a battery assembly according to some embodiments.

An ablating tool or some other cutting or removal tool can be used to separate the U-shaped conductive path 102 into sections, as illustrated by 114, 116 of FIG. 2. The determination as to where to remove the first portion 112 can be based, at least in part, on the locations of the battery tabs 104, 108. The removed portion 112 can be made wide enough to separate the sections 114, 116 (FIG. 2) by a minimum safe distance. The space between the sections can, for example, be made wide enough to prevent short circuiting and/or electromagnetic coupling between the sections 114, 116, the battery tabs 104, 108, and/or battery terminals 106, 110, respectively. With the U-shaped conductive path 102 partitioned, the first section 114 can be connected to the first tab 104, and the second section 116 can be connected to the second tab 108, so as to form a battery assembly as illustrated in FIG. 2. The sections of the U-shaped conductive path 102 can be connected to the tabs 104, 108 by welding, soldering, or other process that establishes an electrical connection therebetween.

With continued reference to FIG. 2, an exemplary battery assembly 111 is illustrated. Battery assembly 111 includes a first tab 104, which is electrically connected to a first terminal 106 of a battery 100, and a second tab 108, which is electrically connected to a second terminal 110 of the battery 100. The first tab 104 has an outer side 122 and an inner side 130. The second tab 108 has an outer side 124 and an inner side 132. The embodiment also includes a first conductive path 114 having a first end 118 and a second conductive path 116 having a second end 120. The first end 118 is separated from the second end 120 by a space 113. The space 113 may be formed by removing a portion (112) of a U-shaped conductive path (102). (See FIG. 1.) In the embodiment of FIG. 2, the first conductive path 114 is connected, electrically and mechanically, to the first tab 104, and the second conductive path 116 is connected, electrically and mechanically, to the second tab 108.

Battery assembly 111 illustrated in FIG. 2 can be formed by determining a position of a first tab 104 connected to a first terminal 106 of a battery 100, determining a position of a second tab 108 connected to a second terminal 110 of the battery 100, and then partitioning a U-shaped conductive path (102) into a first section 114 and a second section (116). The U-shaped conductive path (102) can be partitioned by removing a first portion (112) of the U-shaped conductive path (102). Formation of the battery assembly 111 can be completed by electrically and mechanically connecting the first section 114 to the first tab 104, and connecting the second section 116 to the second tab 108.

Figure 3:
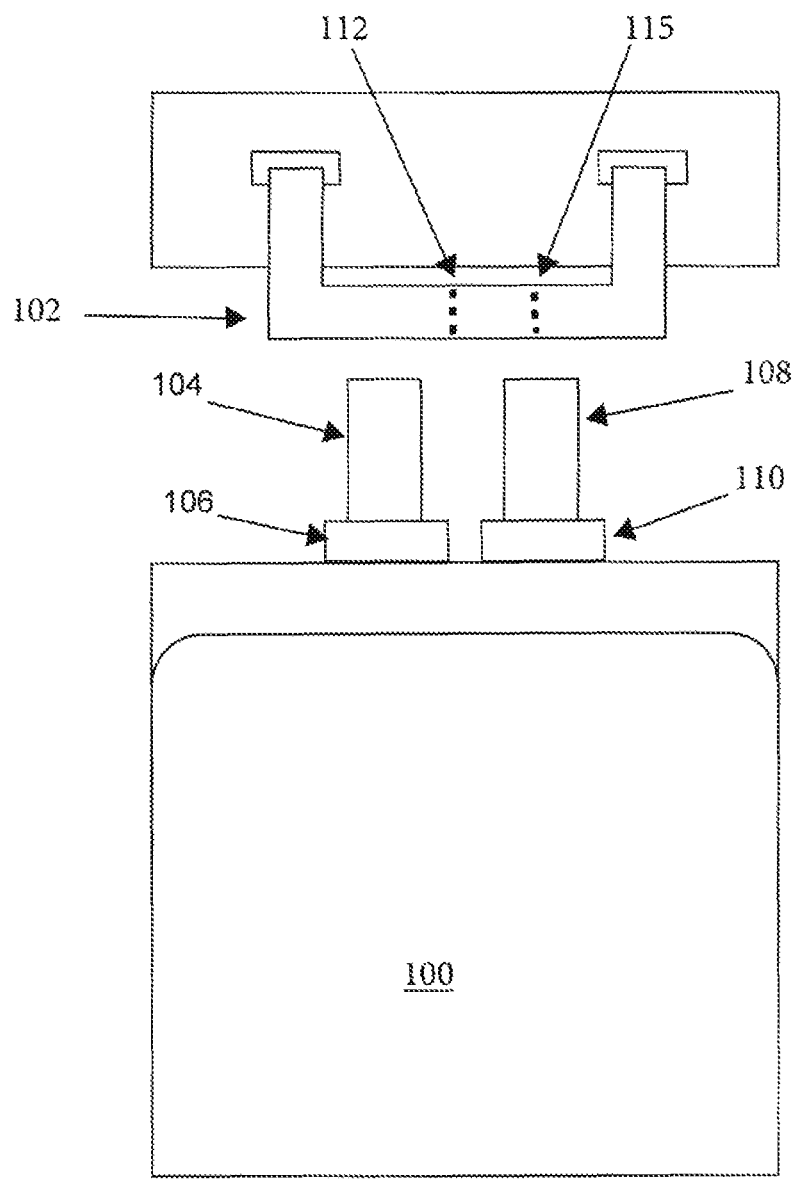
FIG. 3 illustrates components that can form a battery assembly.

FIG. 3 illustrates that in addition to the first portion 112, a second portion 115 can be removed from the U-shaped conductive path 102, which also results in the removal of the section of U-shaped conductive path 102 disposed between the first portion 112 and the second portion 115. U-shaped conductive path 102 is shown above a battery 100. The battery 100 has a first tab 104 electrically connected to its first terminal 106. The battery 100 also has a second tab 108 electrically connected to its second terminal 110. According to one method of forming a battery assembly (111), the position of the first tab 104 and the position of the second tab 108 are determined. A vision system can be used to determine positions of the tabs 104, 108. Once the positions of the tabs 104, 108 are determined, the U-shaped conductive path 102 can be partitioned into a first section (e.g., 114 in FIG. 4) and a second section (e.g., 116 in FIG. 4). In some embodiments, partitioning is done by removing a first portion 112. Optionally, after the first portion 112 is removed, a second portion 115 can also be removed, which will also remove the section of U-shaped conductive path 102 located between first portion 112 and second portion 115. As indicated previously, an ablating tool or some other removal tool known in the art can be used to remove the first portion 112 and the second portion 115. The determination as to where to remove the first portion 112 and the second portion 115 can be based, at least in part, on the locations of the tabs 104, 108 as determined by a machine vision or other industrial location system. Removing two portions from the U-shaped conductive path 102 will, in most instances, create a gap between the sections 114, 116 that is larger than if only one portion were removed because the section of the U-shaped conductive path 102 between the two portions 112 and 115 is also removed. As was discussed with regard to FIG. 1, once the two portions 112, 114 are removed from the U-shaped conductive path 102, the first section (114) can be connected to the first tab 104, and the second section (116) can be connected to the second tab 108. Again, the sections of the U-shaped conductive path 102 can be connected to the tabs 104, 108 by welding, soldering, or other process that establishes an electrical connection therebetween.

Figure 4:
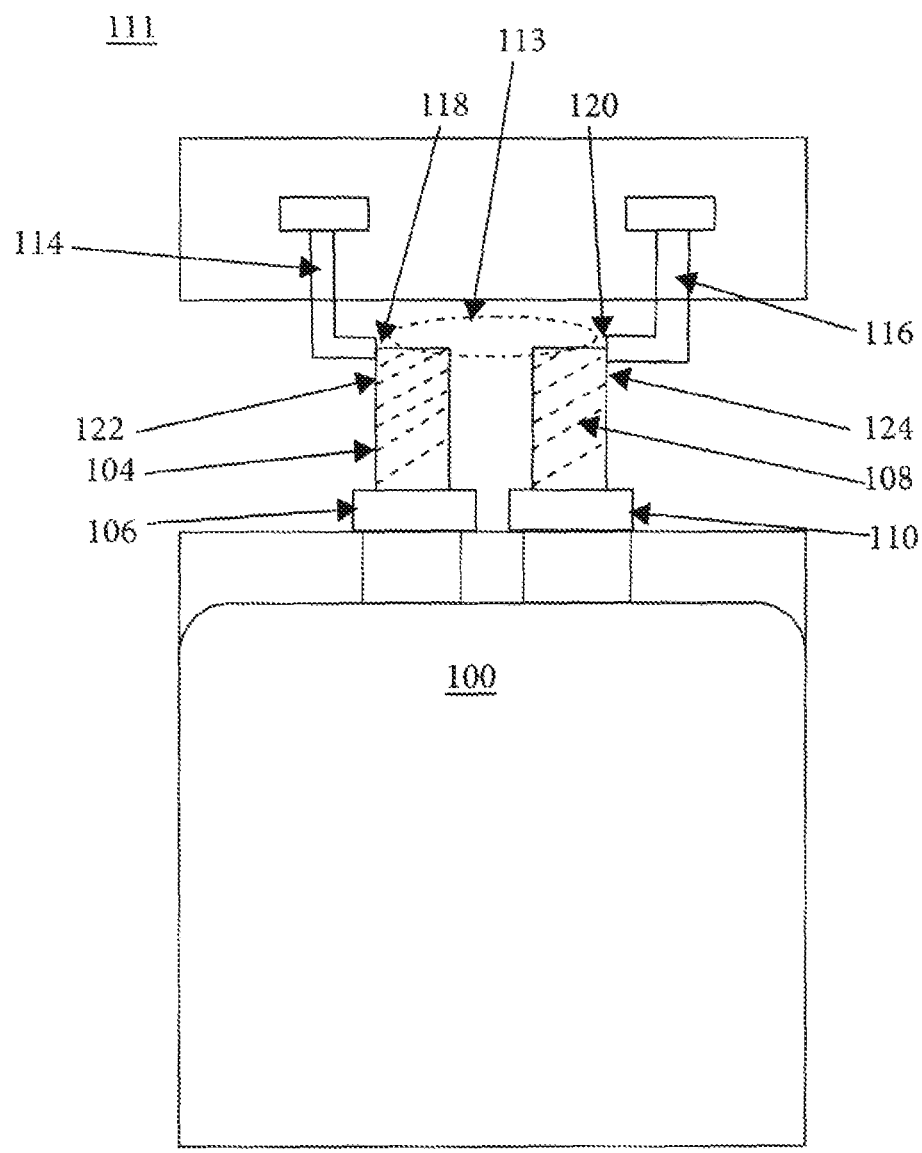
FIG. 4 illustrates a battery assembly according to some embodiments.

FIG. 4 illustrates battery assembly 111 in accordance with some embodiments, in which battery assembly 111 includes a first tab 104, which is electrically connected to a first terminal 106 of a battery 100, and a second tab 108, which is electrically connected to a second terminal 110 of the battery 100. The first tab 104 has an outer side 122 and an inner side 130. Likewise, the second tab 108 has an outer side 124 and an inner side 132. The embodiment also includes a first conductive path 114 having a first end 118 and a second conductive path 116 having a second end 120. The first end 118 is separated from the second end 120 by a space 113. The space 113 can be formed by removing a first portion (112) and then a second portion (115) from a U-shaped conductive path (102). As before, the first conductive path 114 is connected to the first tab 104, and the second conductive path 116 is connected to the second tab 108. The space 113 separating conductive path 114 from conductive path 116 is larger than that of FIG. 2. In the embodiment of FIG. 4, the first end 118 of the first conductive path 114 is aligned with an outer side 122 of the first tab 104, and the second end 120 of the second conductive path 116 is aligned with the outer side 124 of the second tab 108. The embodiment of the battery assembly 111 illustrated in FIG. 4 can be formed by first determining a position of an outer side 122 of the first tab 104, then determining a position of an outer side 124 of the second tab 108. The first end 118 of the first section 114 can then be aligned with the outer side 122 of the first tab 104, and the second end 120 of the second section 116 can be aligned with the outer side 124 of the second tab 108 as shown. The battery assembly 111 is completed by connecting the first section 114 to the first tab 104 and connecting the second section 116 to the second tab 108.

Figure 5:
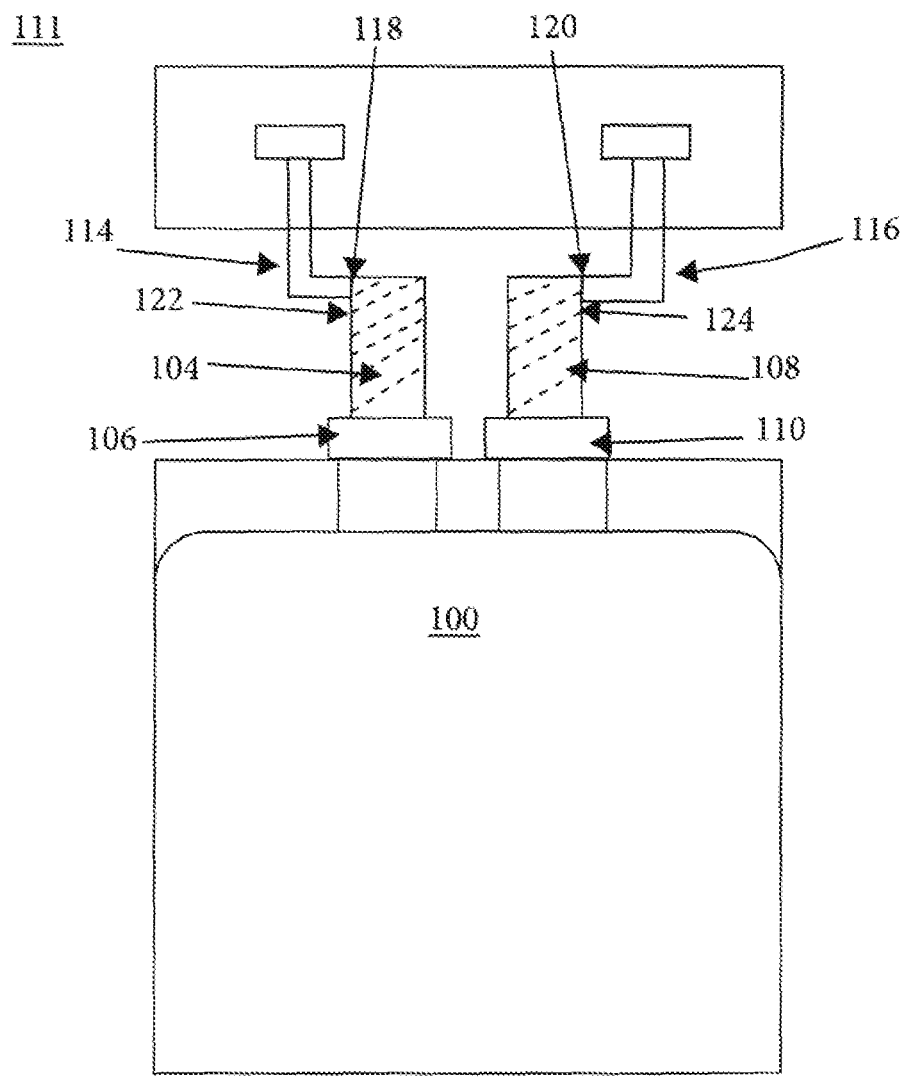
FIG. 5 illustrates a battery assembly according to some embodiments.

FIG. 5 illustrates another battery assembly 111 in accordance with some embodiments. Battery assembly 111 illustrated in FIG. 5 is similar to that illustrated in FIG. 4, except that the ends 118, 120 of the conducive paths are flush with the outer sides 122, 124 of the battery tabs 104, 108. Battery assembly 111 includes a first tab 104, which is electrically connected to a first terminal 106 of a battery 100, and a second tab 108, which is electrically connected to a second terminal 110 of the battery 100. The first tab 104 has an outer side 122 and an inner side 130. Likewise, the second tab 108 has an outer side 124 and an inner side 132. Battery assembly 111 also includes a first conductive path 114 having a first end 118 and a second conductive path 116 having a second end 120. The first end 118 is a distance from the second end 120, separated by a space 113. The space 113 can be formed by removing a first portion (112) and then a second portion (115) from a U-shaped conductive path (102). As described above, the first conductive path 114 is connected to the first tab 104, and the second conductive path 116 is connected to the second tab 108. The space 113 separating conductive path 114 from conductive path 116 is larger than that of FIG. 2. As illustrated in FIG. 5, the first end 118 of the first conductive path 114 is flush with the outer side 122 of the first tab 104, and the second end 120 of the second conductive path 116 is flush with an outer side 124 of the second tab 108, that is, the both ends 118, 120, are in full contact with the outer sides 122, 124 of the first and second tabs 104, 108, respectively.

The battery assembly 111 illustrated in FIG. 5 can be formed by first determining a position of an outer side 122 of the first tab 104, then determining a position of an outer side 124 of the second tab 108. The first end 118 of the first section 114 can then be set flush with the outer side 122 of the first tab 104, and the second end 120 of the second section 116 can be set flush with the outer side 124 of the second tab 108 as shown. The battery assembly 111 is completed by connecting the first section 114 to the first tab 104 and connecting the second section 116 to the second tab 108.

Figure 6:
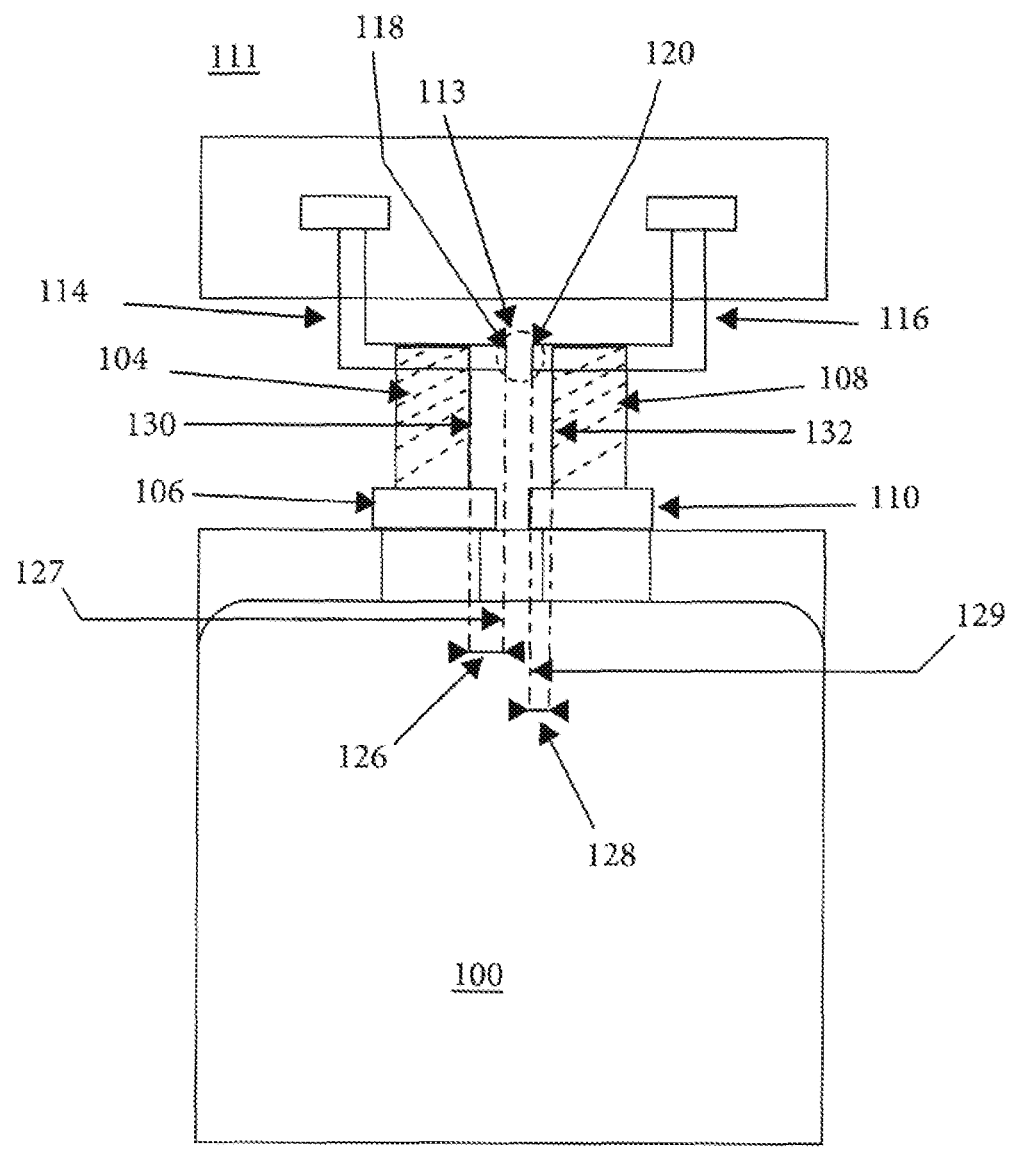
FIG. 6 illustrates a battery assembly according to some embodiments.

FIG. 6 illustrates another battery assembly 111 in accordance with some embodiments. Battery assembly 111 includes a first tab 104, which is electrically connected to a first terminal 106 of a battery 100, and a second tab 108, which is electrically connected to a second terminal 110 of the battery 100. The first tab 104 has an outer side 122 and an inner side 130. Likewise, the second tab 108 has an outer side 124 and an inner side 132. Battery assembly 111 also includes a first conductive path 114 having a first end 118 and a second conductive path 116 having a second end 120. The first end 118 is separated from the second end 120 by a space 113. The space 113 can have been formed by removing first and second portions (112, 115) from a U-shaped conductive path (102). The first conductive path 114 is connected to the first tab 104, and the second conductive path 116 is connected to the second tab 108. The first end 118 of the first conductive path 114 is a first distance 126 from the inner side 130 of the first tab 104, and the second end 120 is a second distance 128 from an inner side 132 of the second tab 108.

Battery assembly 111 illustrated in FIG. 6 can be formed by determining a position of a first tab 104 connected to a first terminal 106 of a battery 100 and a position of a second tab 108 connected to a second terminal 110 of the battery 100 using a machine vision or other industrial sensing and positioning system. A first portion (112) of the U-shaped tab can be removed along a first line 127 that is a first distance 126 from an inner side 130 of the first tab 104, forming a first section 114 and a second section 116. (Alternatively, the location of the portion to be removed can be located with respect to an outer side or a centerline of the battery tab.) A second portion (115) of the U-shaped tab can be removed along a second line 129 that is a second distance 128 from an inner side 132 of the second tab 108, thereby making the second section 116 smaller than it was and increasing the space 113 between the end 118 of the first section 114 and the end 120 of the second section 116. (Alternatively, the location of the portion to be removed can be located with respect to an outer side or a centerline of the battery tab.) Thereafter, the first section 114 can be connected to the first tab 104, and the second section 116 can be connected to the second tab 108.

Figure 7:
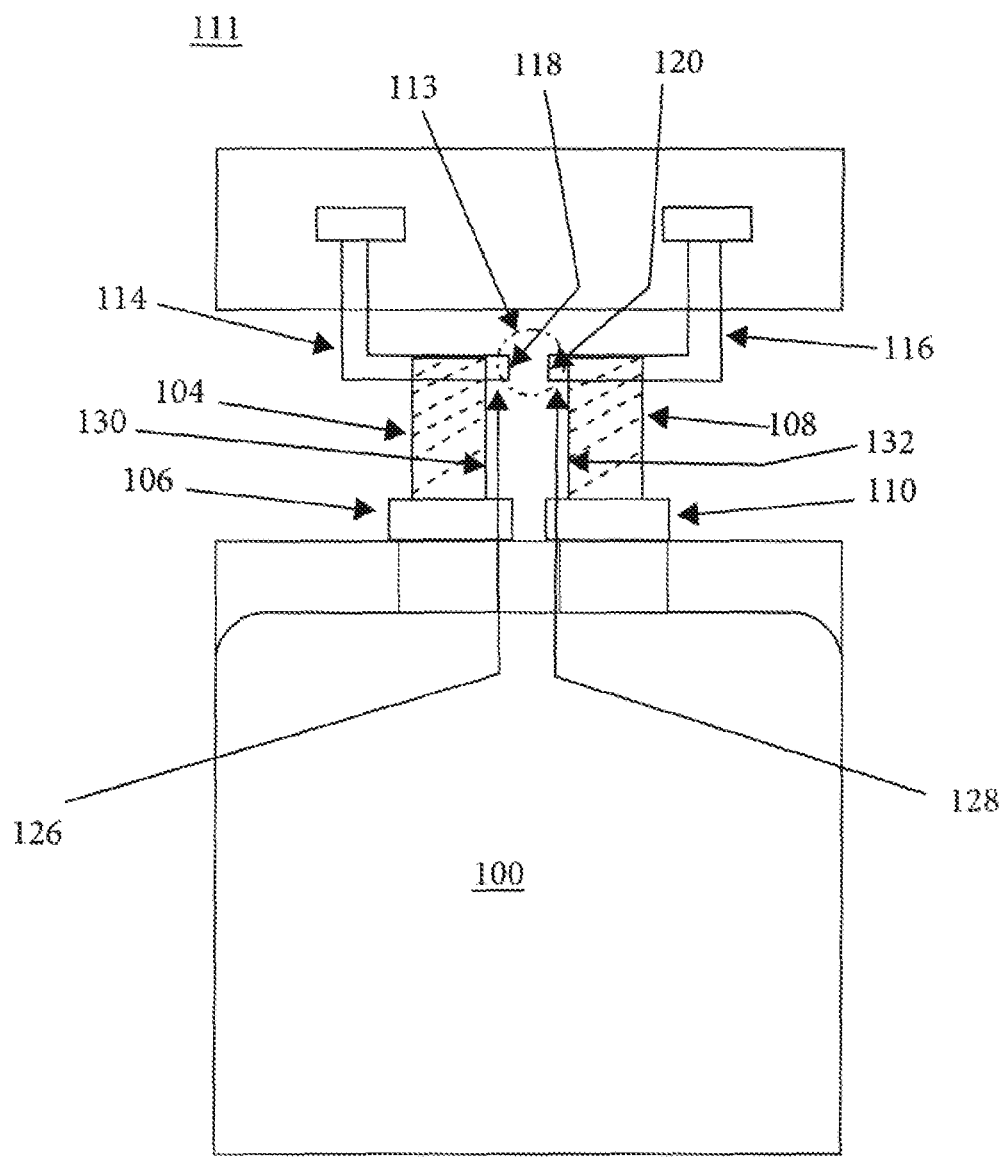
FIG. 7 illustrates a battery assembly according to some embodiments.

FIG. 7 illustrates another battery assembly 111 in accordance with some embodiments. The battery assembly 111 of FIG. 7 is similar to that of FIG. 6, except the distance 126 from the first end 118 of the first section 114 to the inner side 130 of the first tab 104 is the same as the distance 128 from the second end 120 of the second section 116 from the inner side 132 of the second tab 108.

Battery assembly 111 as illustrated in FIG. 7 can be constructed by acquiring a battery 100 that has a first tab 104 that is electrically connected to a first terminal 106 of the battery 100, and a second tab 108 that is electrically connected to a second terminal 110. A U-shaped conductive path (102) is then obtained. The positions of the first and second tabs 104, 108 are determined; the positions of the inner sides (130, 132) of the tabs (104,108) can be determined. A first portion (112) is removed along a line that is a distance 126 from the inner side 130 of tab 104, and a second portion (115) is removed along a line that is the same distance 128 from the inner side 132 of the second battery tab 108. (Alternatively, the location of the portion to be removed can be located with respect to an outer side or a centerline of the battery tab.)

Figure 8:
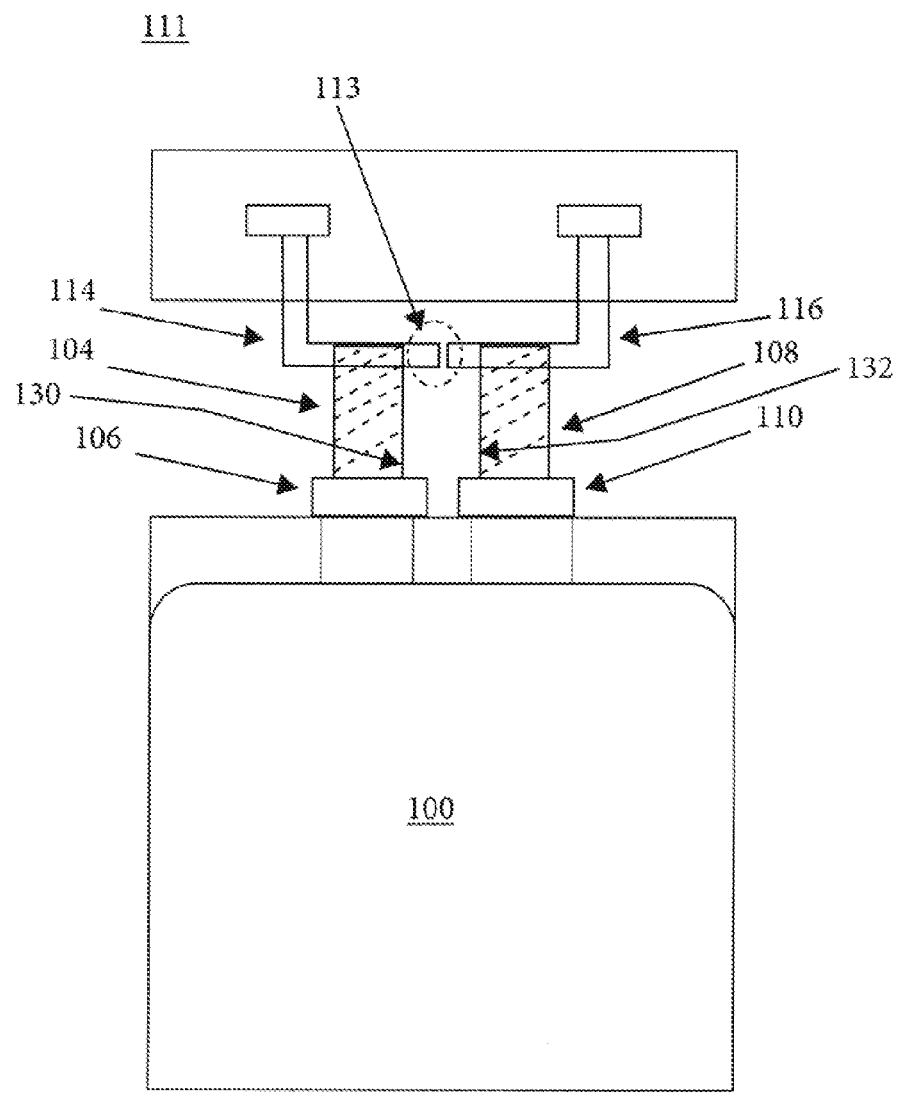
FIG. 8 illustrates a battery assembly according to some embodiments.

FIG. 8 illustrates another battery assembly 111 in accordance with some embodiments, which is similar to some of the embodiments described above. Note, though, that space 113 is smaller than in FIG. 7. The space 113 is formed by removing only a portion (112) at about the halfway point between the tabs 104, 108. The first conductive path 114 is coupled to the first terminal 106 via the first tab 104 and the second conductive path 116 is coupled to the second terminal 110 via the second tab 108. The first and second conductive paths 114, 116 are separated by space 113 formed by removing a portion (112) of a U-shaped conductive path (102) along a line centrally located between the inner sides 130, 132 of the battery tabs 104, 108.

Figure 9:
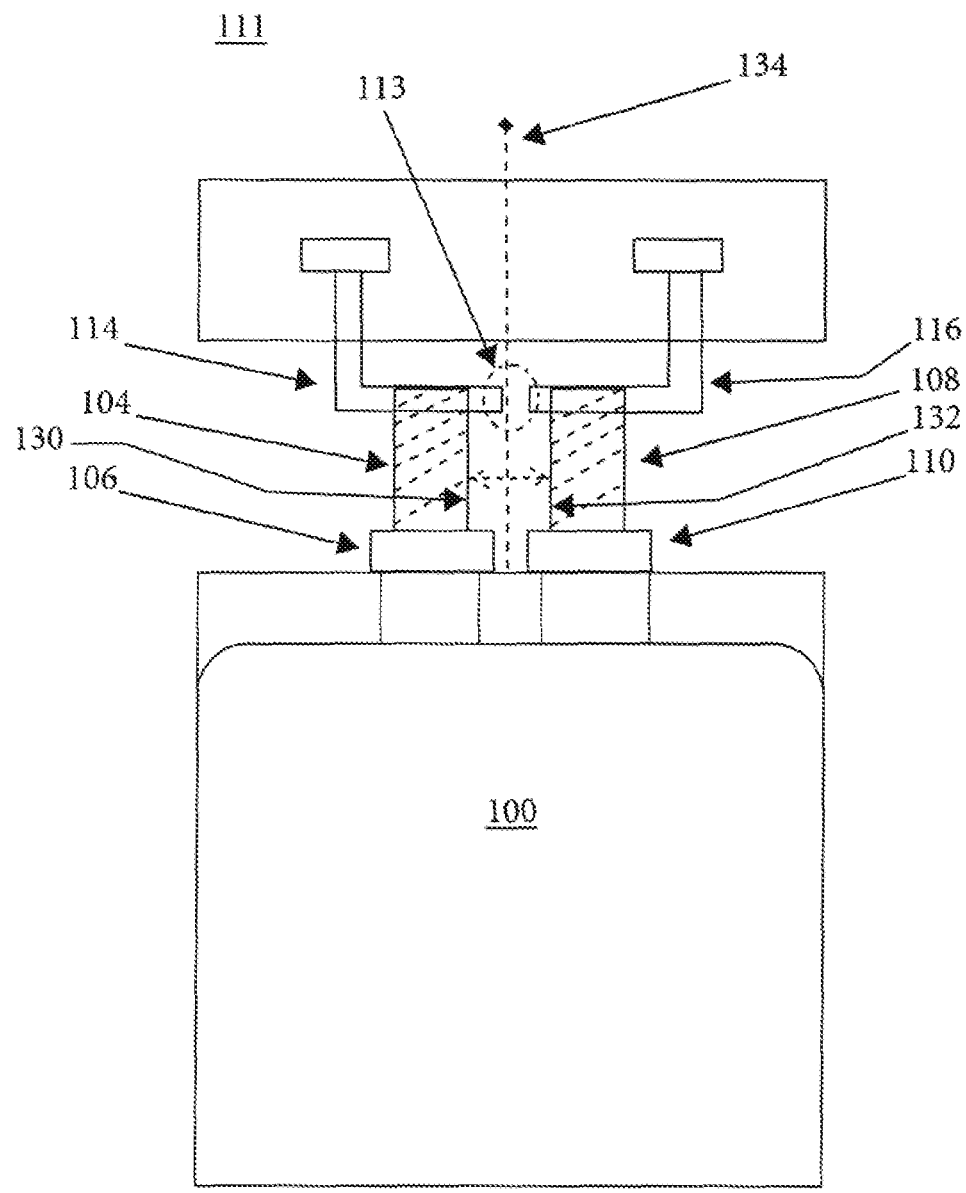
FIG. 9 illustrates a battery assembly according to some embodiments.

FIG. 9 illustrates another battery assembly 111 similar to that of FIG. 8; however, space 113 is larger and is not as centralized between the tabs 104, 108. The space 113 between the sections 114 and 116 overlaps a line 134 that is midway between an inner side 130 of the first tab 104 and an inner side 132 of the second tab 108, the space 113 having been created by removing at least one portion (112) of a U-shaped conductive path (102) along said line 134. Selection of a first cutting line 134 could involve locating the inner sides 130, 132 of the tabs 104, 108, dividing the distance between the two 130, 132 in half. After a first portion (112) is removed, a second portion (115) can be removed at some distance line 134, thereby enlarging space 113.

Figure 10:
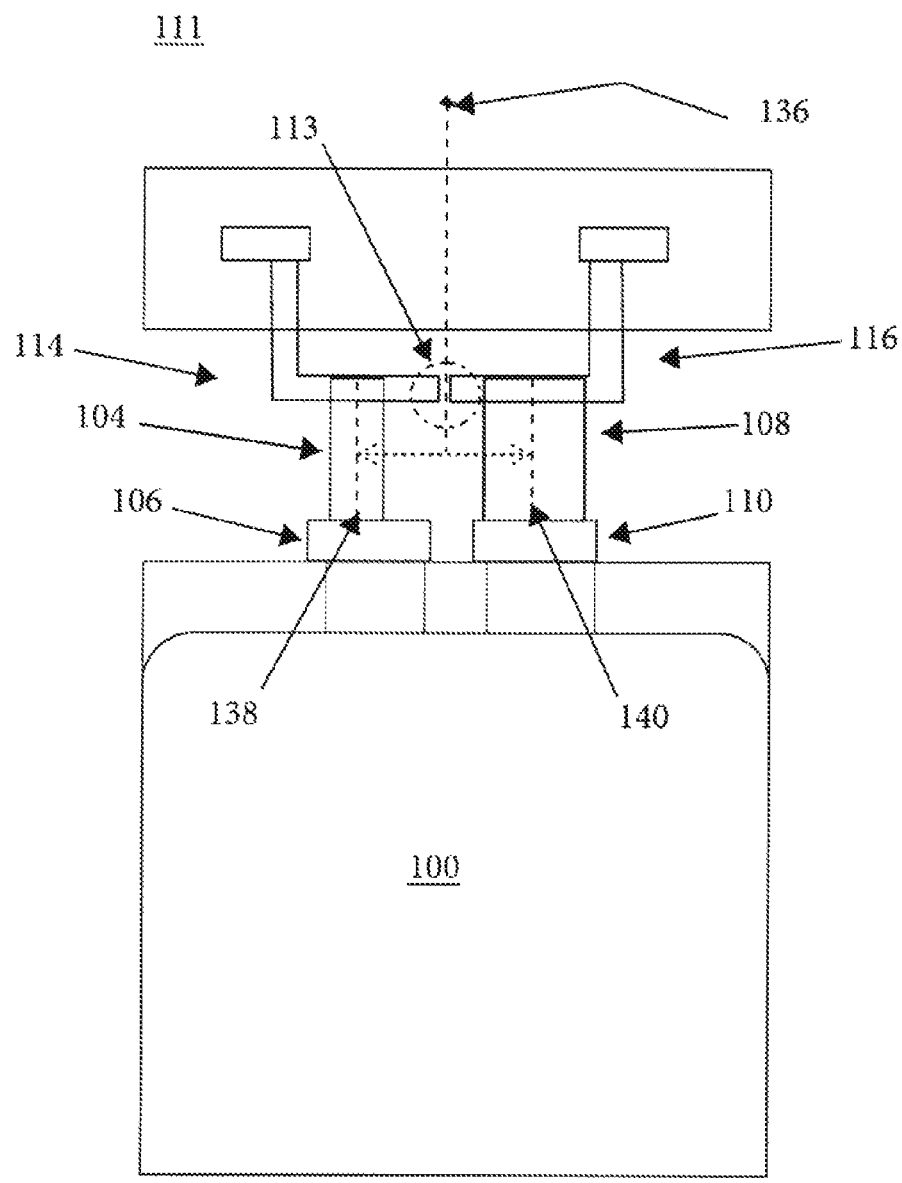
FIG. 10 illustrates a battery assembly according to some embodiments.

FIG. 10 illustrates a battery assembly 111 similar to that of FIG. 9; however, centerlines 138, 140 of tabs 104, 108 are used as reference during formation of assembly 111. Also, the space 113 between the conductive paths 114, 116 overlaps a line 136, which is midway between a centerline 138 of the first tab 104, and a centerline 140 of the second tab 108, the space 113 having been created by removing at least one portion (112) of a U-shaped conductive path (102) along said line 136. Selection of the cutting line 136 could involve locating the centerlines 138, 140 of the tabs 104, 108 and dividing the distance between the two 138, 140 in half.

Figure 11:
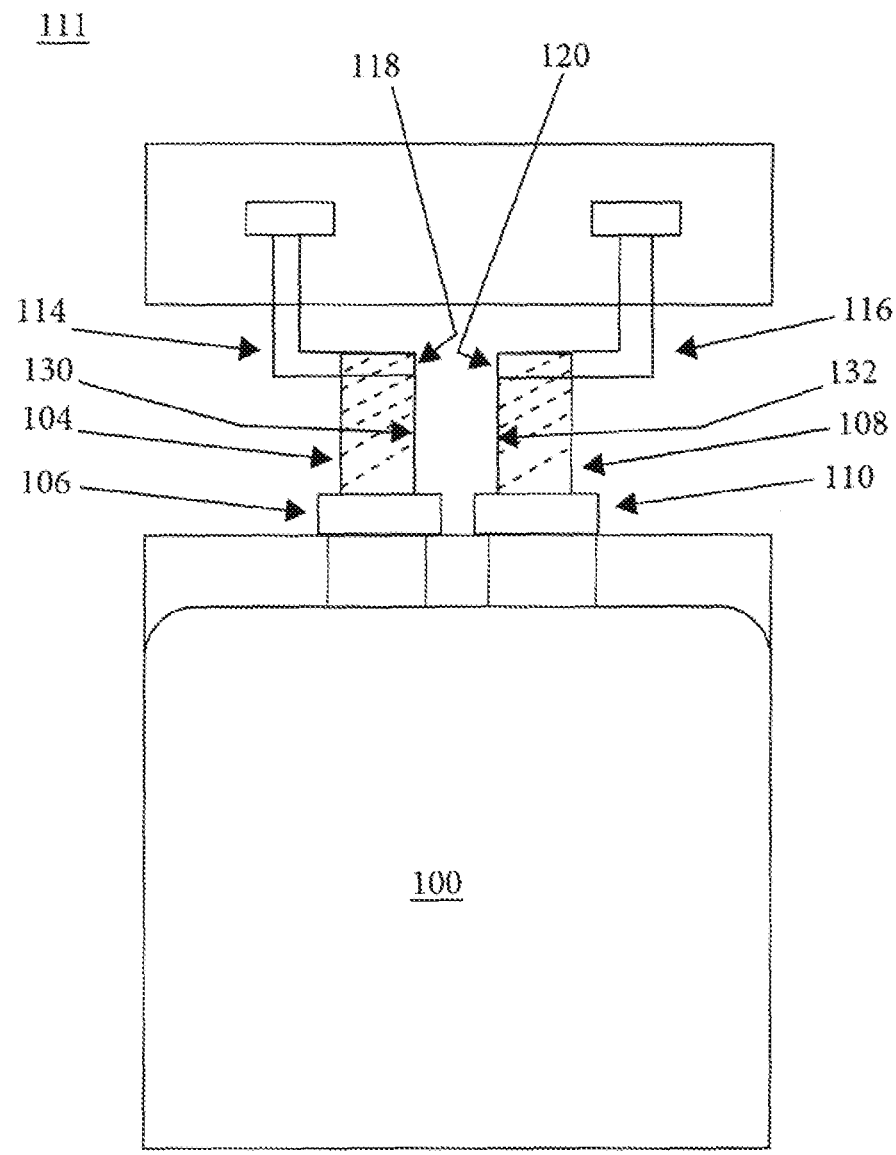
FIG. 11 illustrates a battery assembly according to some embodiments.

FIG. 11 illustrates a battery assembly 111 in accordance with some embodiments and in which the first and second tabs 104, 108 are connected to first and second terminals 106, 110 of a battery 100 as described above with reference to FIGS. 2-10. The first conductive path 114 is connected to the first tab 104, and the second conductive path 116 is connected to the second tab 108. However, the first end 118 of the first conductive path 114 is aligned with the inner edge 130 of the first tab 104, and the second end 120 of the second conductive path 116 is aligned with the inner edge 132 of the second tab 108. The first end 118 of the first conductive path 114 can be aligned with the inner side 130 of the first tab 104 by removing a first portion (112) of a U-shaped conductive path (102) along a line that overlaps the inner side 130 of the first tab 104. The second end 120 of the second conductive path 116 can be aligned with the inner side 132 of the second tab 108 by removing a second portion (115) of the U-shaped conductive path (102) along a line that overlaps the inner side 132 of the second tab 108. As an alternative, the ends of the first and second portions could be aligned with the centerlines of the corresponding battery tabs, or could be aligned merely to provide any desired minimal degree of overlap with the battery tabs.

Figure 12:
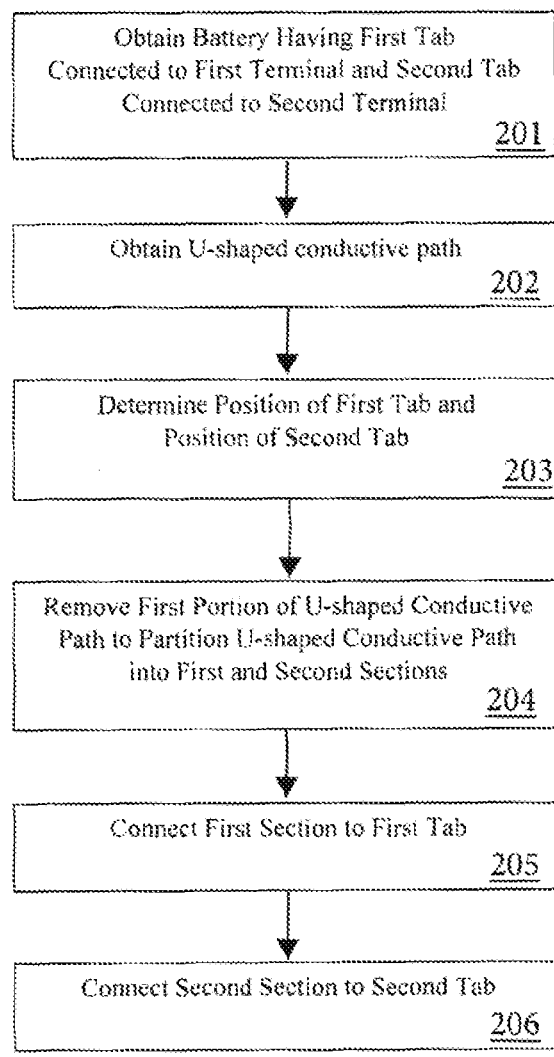
FIG. 12 illustrates a method of forming a battery assembly according to some embodiments.

FIG. 12 illustrates a method 200 of forming a battery assembly (111) in accordance with some embodiments. Method 200 can begin (step 201) with obtaining a battery (100) having a first tab (104) electrically connected to a first terminal (106) of the battery (100) and having a second tab (108) electrically connected to a second terminal (110) of the battery (100). The method 200 can also include step 202, which includes obtaining a U-shaped conductive path (102). In step 203, the positions of the first and second tabs (104, 108) can be determined 203. As described above, this may be done using a machine vision or other industrial sensing and positioning system. Additionally, the positions of tabs may be determined by reference to their edges and/or centerlines, or any suitable combination thereof. Step 204 can include removing a first portion (112) of the U-shaped conductive path (102) to partition the U-shaped conductive path (102) into a first section (114) and a second section (116). In step 205, the first section (114) can be connected to the first tab (104), and in step 206 the second section (116) can be connected to the second tab (108).

Figure 13:
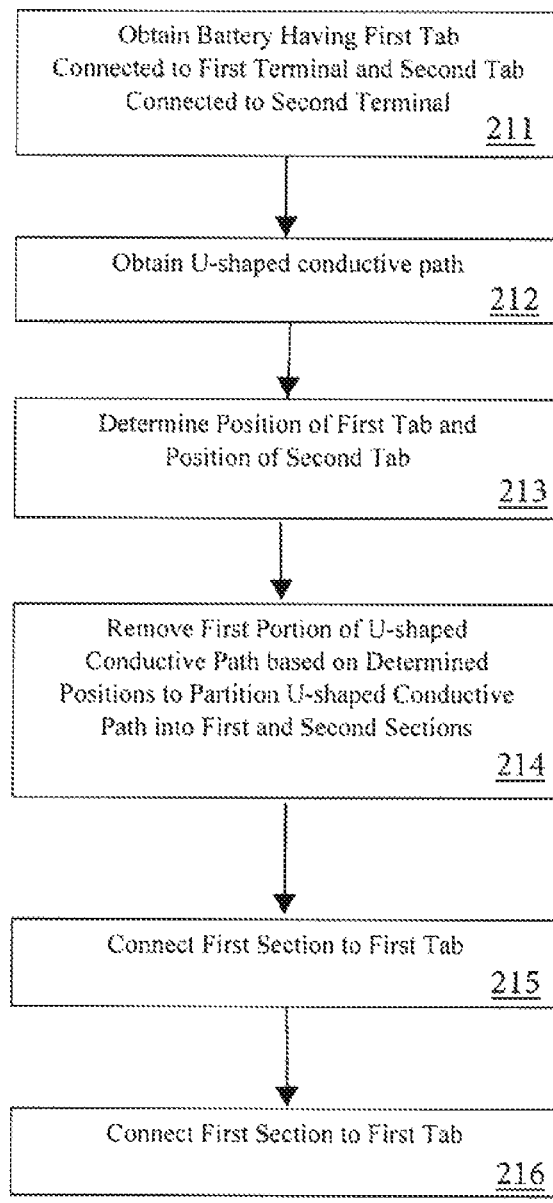
FIG. 13 illustrates a method of forming a battery assembly according to some embodiments.

FIG. 13 illustrates another method 210 of forming a battery assembly (111), which differs from that illustrated in FIG. 12 in that removing a first portion (112) is based on the determined positions of the tabs (104, 108). Step 211 of method 210 can include obtaining a battery (100) having a first tab (104) electrically connected to a first terminal (106) of the battery (100) and having a second tab (108) electrically connected to a second terminal (110) of the battery (100). The method 210 can further include step 212, which includes obtaining a U-shaped conductive path (102). At step 213, the positions of the first and second tabs (104,108) can be determined 203. Step 214 includes removing, based on the determined positions, a first portion (112) of the U-shaped conductive path (102) to partition the U-shaped conductive path (102) into a first section (114) and a second section (116). Step 215 can include connecting the first section (114) to the first tab (104), and step 216 can include connecting the second section (116) to the second tab (108).

Figure 14:
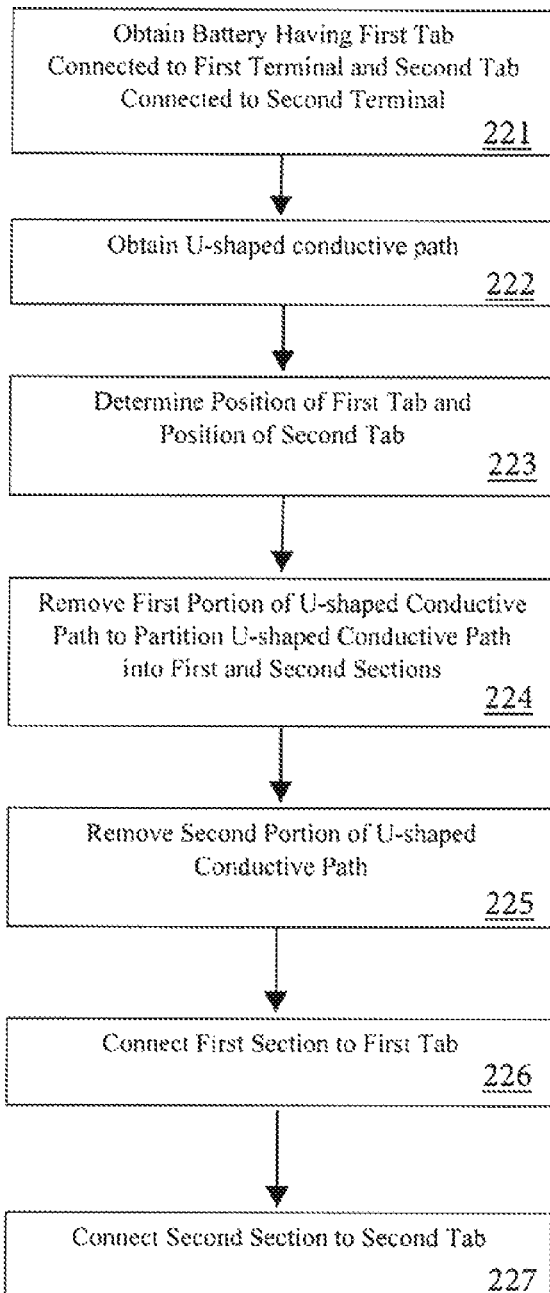
FIG. 14 illustrates a method of forming a battery assembly according to some embodiments.

FIG. 14 illustrates another method 220 of forming a battery assembly (111), which can include step 221, obtaining a battery (100) having a first tab (104) electrically connected to a first terminal of the battery (100) and having a second tab (108) electrically connected to a second terminal (110) of the battery (100). Step 222 can include obtaining a U-shaped conductive path (102). In step 223, the positions of the first and second tabs (104, 108) can be determined 203, which may be done as described above. Step 224 can include removing a first portion (112) of the U-shaped conductive path (102) to partition the U-shaped conductive path (102) into a first section (114) and a second section (116). In step 225, a second portion (115) of the U-shaped conductive path (102) can be removed. In step 226, the first section (114) is connected to the first tab (104), and in step 227, the second section (116) can be connected to the second tab (108).

Figure 15:
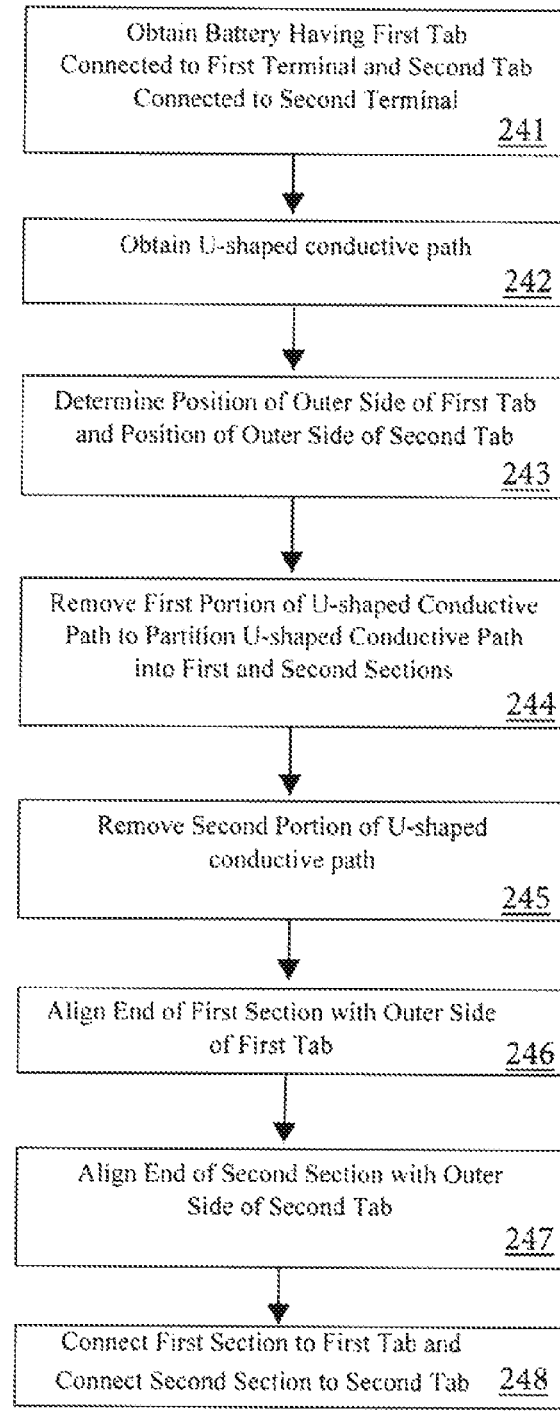
FIG. 15 illustrates a method of forming a battery assembly according to some embodiments.

FIG. 15 illustrates another method 240 of forming a battery assembly (111). Step 241 of the method 240 can include obtaining a battery (100) having a first tab (104) electrically connected to a first terminal (106) of the battery (100) and having a second tab (108) electrically connected to a second terminal (110) of the battery (100). Step 242 can also include obtaining a U-shaped conductive path (102). At step 243, the positions of the first and second tabs (104, 108) can be determined. As noted above, these positions may be determined using a machine vision or other industrial locating and positioning system and may be based on the edges of the tabs, the centerlines of the tabs, or various combinations thereof. In step 244 a first portion (112) of the U-shaped conductive path (102) can be removed to partition the U-shaped conductive path (102) into a first section (114) and a second section (116). In step 245 a second portion (115) of the U-shaped conductive path (102) can be removed. At step 246, the end of the first section (114) can be aligned with the outer side (122) of the first tab (104). At step 247, the end of the second section (116) can be aligned with the outer side (124) of the second tab (108). Step 248 can include connecting the first section (114) to the first tab (104) and connecting the second section (116) to the second tab (108).

Figure 16:
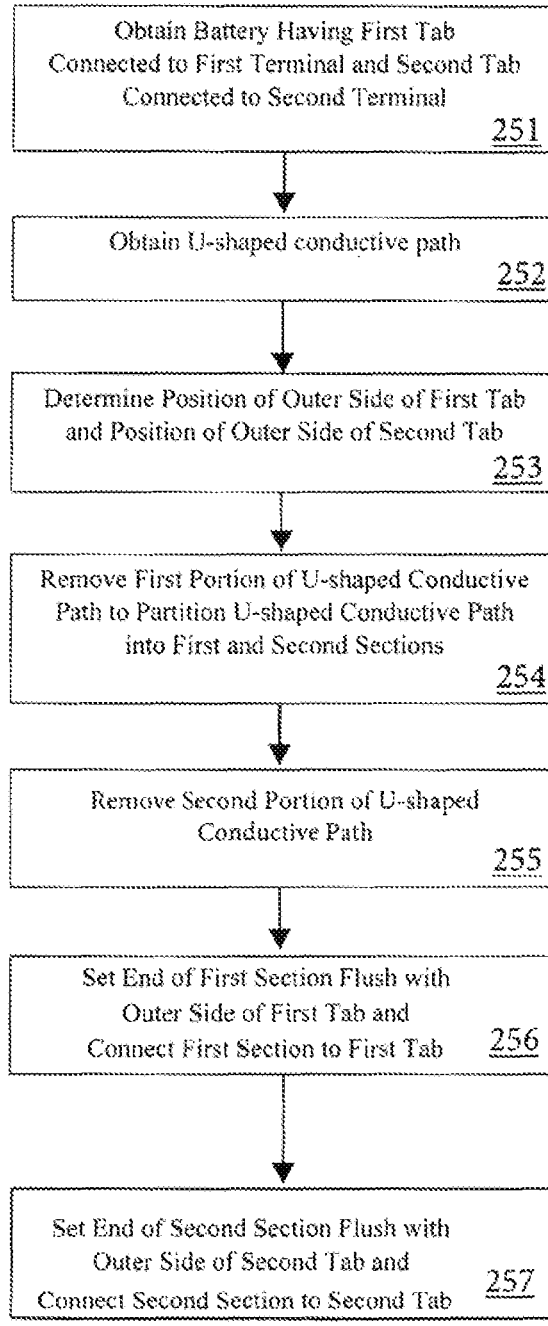
FIG. 16 illustrates a method of forming a battery assembly according to some embodiments.

FIG. 16 illustrates another method 250 of forming a battery assembly (111). Step 251 of the method 250 can include obtaining a battery (100) having a first tab (104) electrically connected to a first terminal (106) of the battery (100) and having a second tab (108) electrically connected to a second terminal (110) of the battery (100). Step 252 can include obtaining a U-shaped conductive path (102). At step 253, the positions of the first and second tabs (104, 108) can be determined. Step 254 can include removing a first portion (112) of the U-shaped conductive path (102) to partition the U-shaped conductive path (102) into a first section (114) and a second section (116). In step 255, a second portion (115) of the U-shaped conductive path (102) can be removed. Step 256 can include setting the first end (118) of the first section (114) flush with the first tab (104) and connecting the first section (114) to the first tab (104). At step 257, the second end (120) of the second section (116) can be set flush with the second tab (108) and the second section (116) can be connected to the second tab (108).

FIG. 17 illustrates another method 260 of forming a battery assembly (111). Step 261 of the method 260 can include obtaining a battery (100) having a first tab (104) electrically connected to a first terminal (106) of the battery (100) and having a second tab (108) electrically connected to a second terminal (110) of the battery (100). Step 262 can include obtaining a U-shaped conductive path (102). In step 263, the positions of the first and second tabs (104, 108) can be determined. Step 264 can include removing a first portion (112) of the U-shaped conductive path (102) along a line that is a first distance (126) from the inner side (130) of the first tab (104) to partition the U-shaped conductive path (102) into a first section (114) and a second section (116). Step 265 can include removing a second portion (115) of the U-shaped conductive path (102) along a line that is a second distance (128) from the inner side (132) of the second tab (108). Step 266 can include connecting the first section (114) to the first tab (104). Step 267 can include connecting the second section (116) to the second tab (108).

Figure 18:
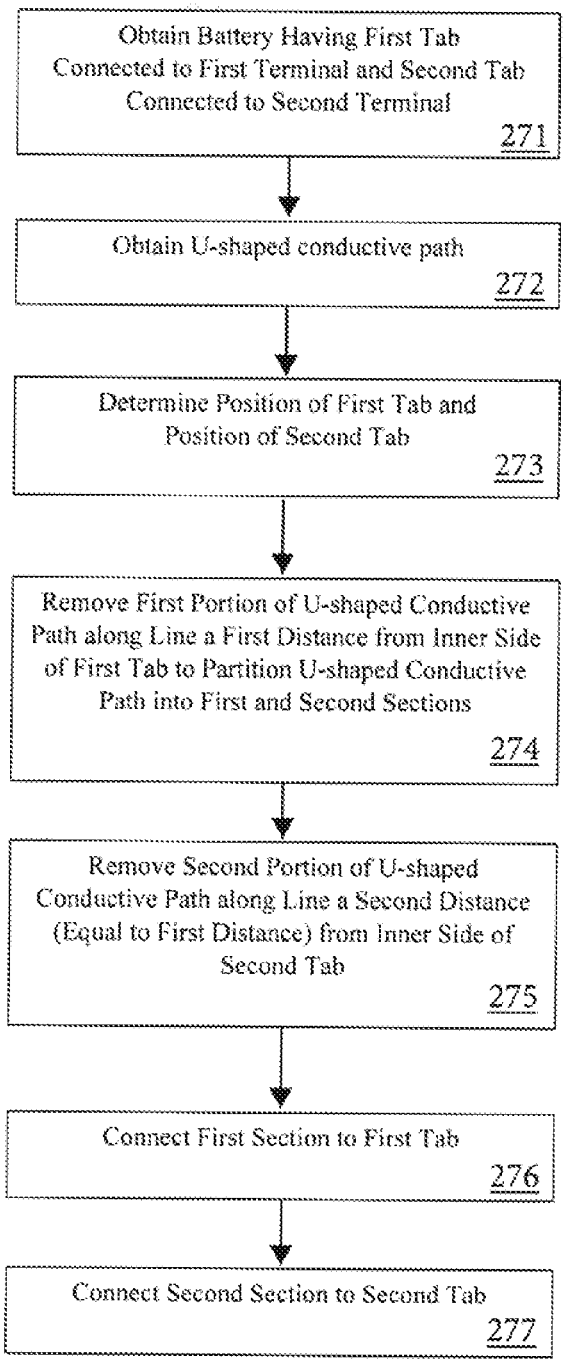
FIG. 18 illustrates a method of forming a battery assembly according to some embodiments.

FIG. 18 illustrates another method 270 of forming a battery assembly (111). Step 271 of the method 270 can include obtaining a battery (100) having a first tab (104) electrically connected to a first terminal (106) of the battery (100) and having a second tab (108) electrically connected to a second terminal (110) of the battery (100). Step 272 can include obtaining a U-shaped conductive path (102). In step 273, the positions of the first and second tabs (104, 108) can be determined. In step 274 a first portion (112) of the U-shaped conductive path (102) is removed along a line that is a first distance (126) from the inner side (130) of the first tab (104) to partition the U-shaped conductive path (102) into a first section (114) and a second section (116). Step 275 can include removing a second portion (115) of the U-shaped conductive path (102) along a line that is the same distance from the inner side (132) of the second tab (108) as the first line (127) is from the inner side (130) of the first tab (104). Step 276 can include connecting the first section (114) to the first tab (104). Step 277 can include connecting the second section (116) to the second tab (108).

Figure 19:
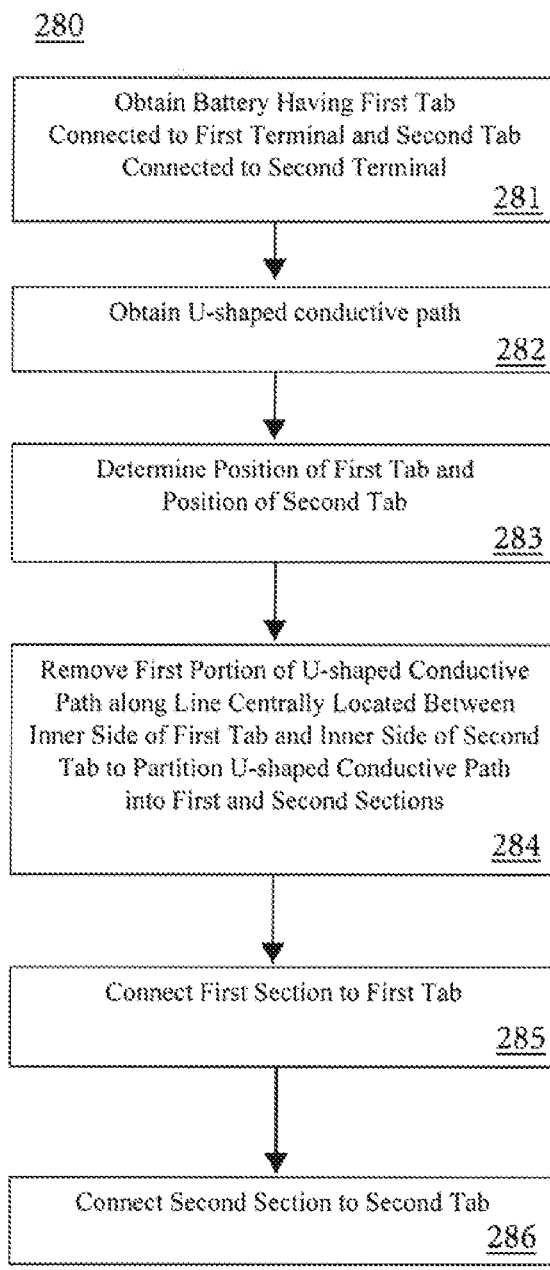
FIG. 19 illustrates a method of forming a battery assembly according to some embodiments.

FIG. 19 illustrates another method 280 of forming a battery assembly (111). Step 281 of the method 280 can include obtaining a battery (100) having a first tab (104) electrically connected to a first terminal (106) of the battery (100) and having a second tab (108) electrically connected to a second terminal (110) of the battery (100). Step 282 can include obtaining a U-shaped conductive path (102). In step 283, the positions of the first and second tabs (104, 108) can be determined. Step 284 can include removing a first portion (112) of the U-shaped conductive path (102) along a line centrally located between an inner side (130) of a first tab (104) and an inner side (132) of a second tab (108), thereby partitioning the U-shaped conductive path (102) into a first section (114) and a second section (116). Step 285 can include connecting the first section (114) to the first tab (104). Step 286 can include connecting the second section (116) to the second tab (108).

Figure 20:
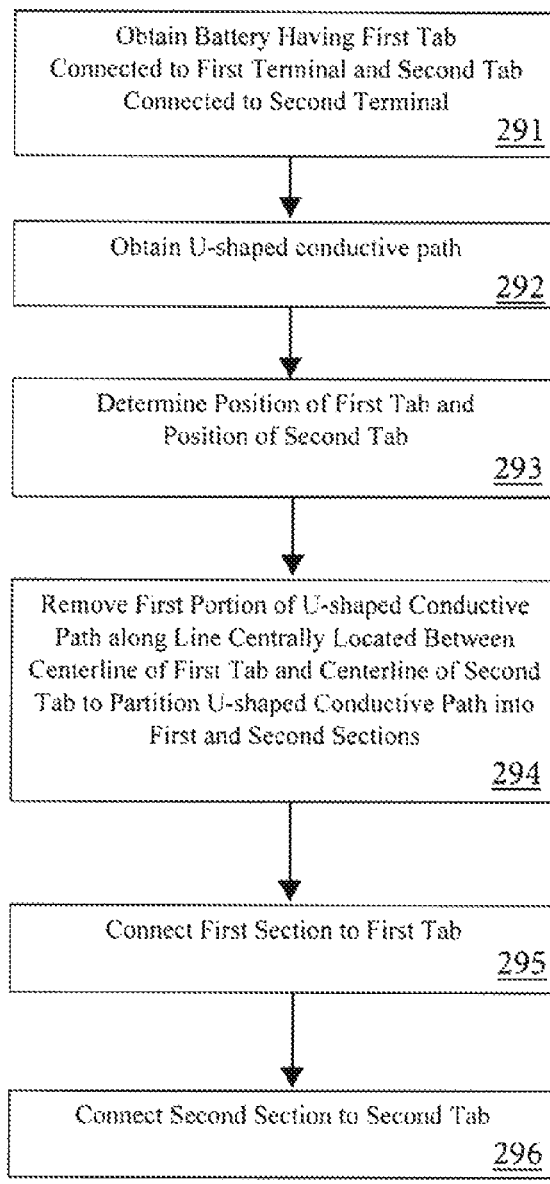
FIG. 20 illustrates a method of forming a battery assembly according to some embodiments.

FIG. 20 illustrates another method 290 of forming a battery assembly (111). Step 291 of the method 290 can include obtaining a battery (100) having a first tab (104) electrically connected to a first terminal (106) of the battery (100) and having a second tab (108) electrically connected to a second terminal (110) of the battery (100). Step 292 can include obtaining a U-shaped conductive path (102). In step 293, the positions of the first and second tabs (104, 108) can be determined. Determining the positions of the first and second tabs (104, 108) can include determining the locations of centerlines of the tabs (104, 108). Step 294 can include removing a first portion (112) of the U-shaped conductive path (102) along a line that is centrally located between a centerline of a first tab (104) and a centerline of a second tab (108), thereby partitioning the U-shaped conductive path (102) into a first section (114) and a second section (116). Step 295 can includes connecting the first section (114) to the first tab (104), and step 296 can include connecting the second section (116) to the second tab (108).

Figure 21:
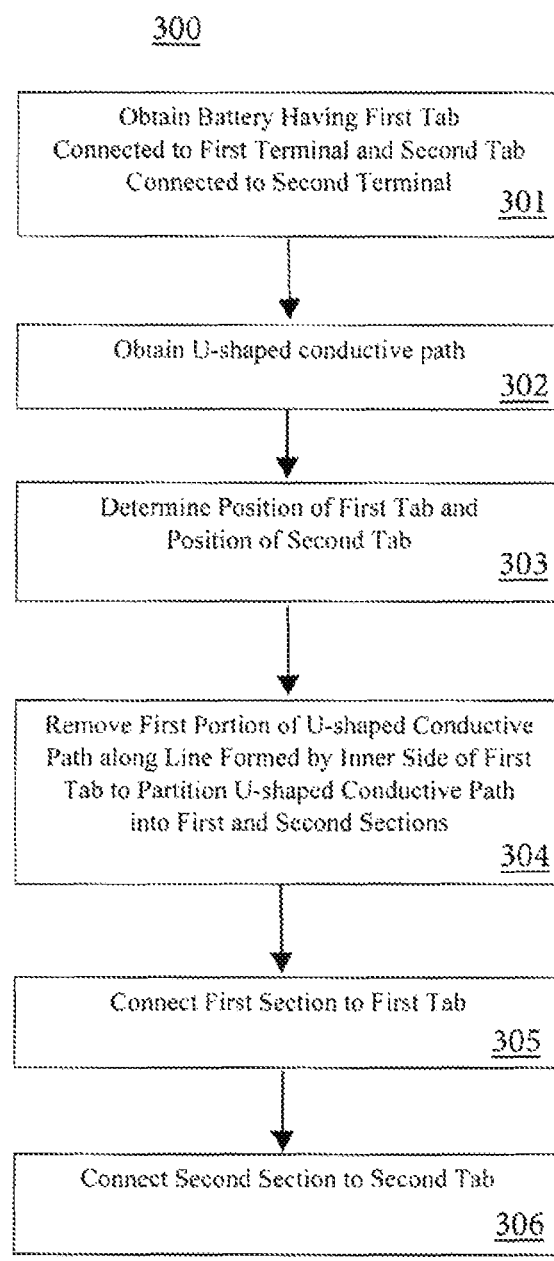
FIG. 21 illustrates a method of forming a battery assembly according to some embodiments.

FIG. 21 illustrates another method 300 of forming a battery assembly (111). Step 301 of the method 300 can include obtaining a battery (100) having a first tab (104) electrically connected to a first terminal (106) of the battery (100) and having a second tab (108) electrically connected to a second terminal (110) of the battery (100). Step 302 can include obtaining a U-shaped conductive path (102). At step 303, the positions of the first and second tabs (104, 108) can be determined. In step 304 a first portion (112) of the U-shaped conductive path (102) is removed along a line formed by an inner side (130) of the first tab (104) (or along a line formed by an inner side (132) of the second tab (108)), thereby partitioning the U-shaped conductive path (102) into a first section (114) and a second section (116). Step 305 can include connecting the first section (114) to the first tab (104), and step 306 can include connecting the second section (116) to the second tab (108).

Figure 22:
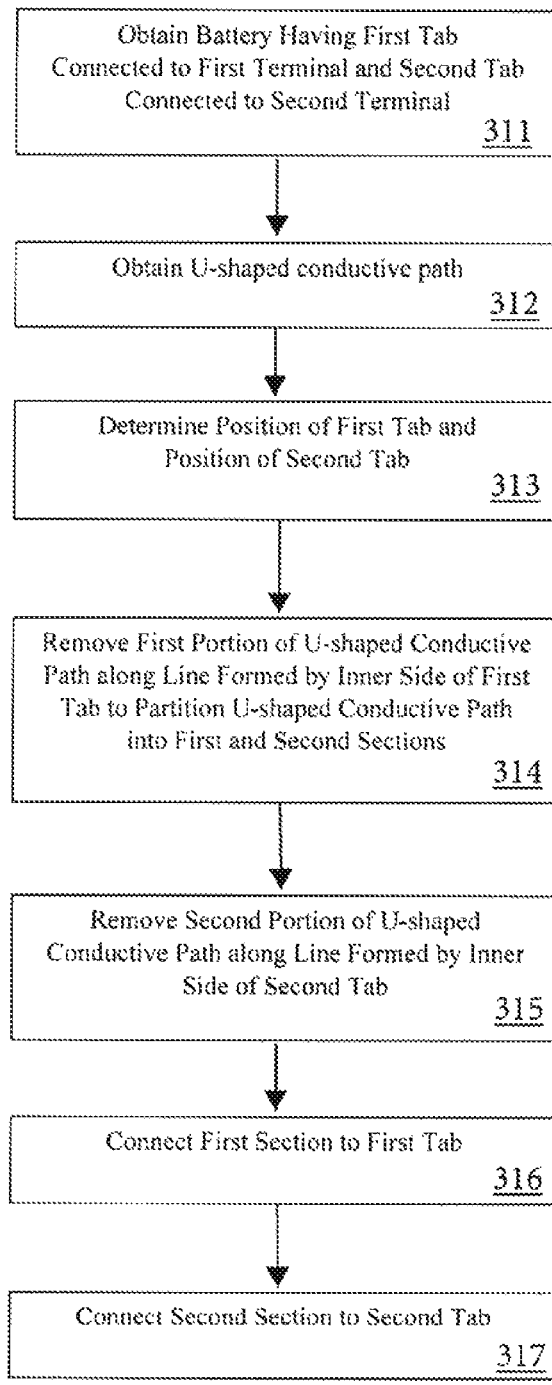
FIG. 22 illustrates a method of forming a battery assembly according to some embodiments.

FIG. 22 illustrates another method 310 of forming a battery assembly (111). Step 311 of the method 310 can include obtaining a battery (100) having a first tab (104) electrically connected to a first terminal (106) of the battery (100) and having a second tab (108) electrically connected to a second terminal (110) of the battery (100). Step 312 can include obtaining a U-shaped conductive path (102). At step 313, the positions of the first and second tabs (104, 108) can be determined. Step 314 can include removing a first portion (112) of the U-shaped conductive path (102) along a line formed by an inner side (130) of the first tab (104) (or along a line formed by an inner side (132) of the second tab (108)), thereby partitioning the U-shaped conductive path (102) into a first section (114) and a second section (116). Step 315 can include removing a second portion (115) of the U-shaped conductive path (102) along a line formed by an inner side (132) of the second tab (108) (or along a line formed by an inner side (130) of the first tab (104)). Step 316 can include connecting the first section (114) to the first tab (104). Step 317 can include connecting the second section (116) to the second tab (108).

FIG. 23 illustrates a process for constructing a battery assembly. The process 320 can include determining 321 a position of a first tab (104) connected to a first terminal (106) of a battery (100) and determining 322 a position of a second tab (108) connected to a second terminal (110) of the battery (100). The process can also include partitioning a U-shaped conductive path (102) into a first section (114) and a second section (116) by removing a first portion (112) of the U-shaped conductive path (102). Step 324 can include connecting the first section (114) to the first tab (104), and step 325 can include connecting the second section (116) to the second tab (108).

Figure 24:
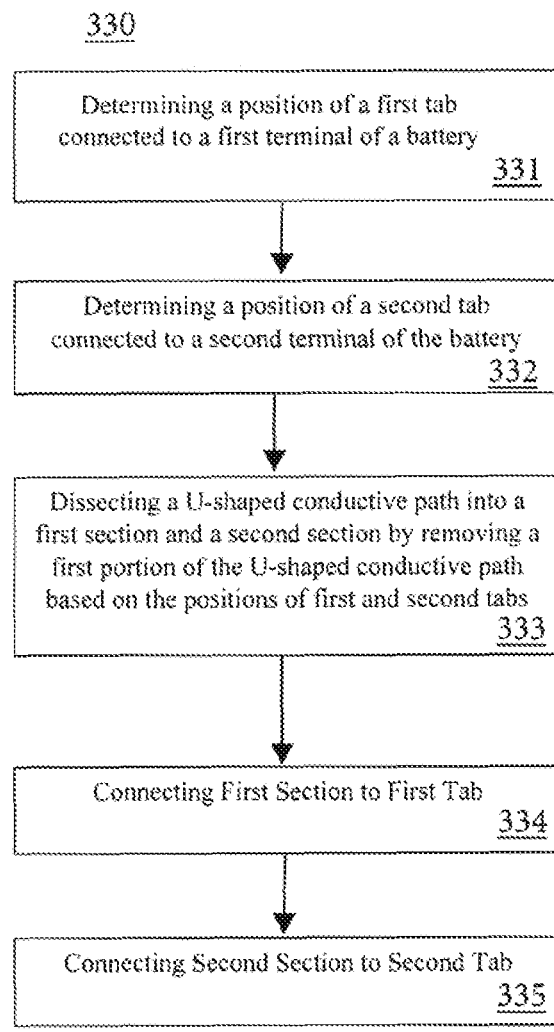
FIG. 24 illustrates a process by which a battery assembly can be formed according to some embodiments.

FIG. 24 illustrates another process for constructing a battery assembly. The process 330 can include determining 331 a position of a first tab (104) connected to a first terminal (106) of a battery (100) and determining 332 a position of a second tab (108) connected to a second terminal (110) of the battery (100). Step 333 can include partitioning, based on the positions of the first and second tabs (104, 108), a U-shaped conductive path (102) into a first section (114) and a second section (116) by removing a first portion (112) of the U-shaped conductive path (102). Step 334 can include connecting the first section (114) to the first tab (104), and step 335 can include connecting the second section (116) to the second tab (108).

FIG. 25 illustrates another process for constructing a battery assembly. The process 340 can include determining 341 a position of a first tab (104) connected to a first terminal (106) of a battery (100), and determining 342 a position of a second tab (108) connected to a second terminal (110) of the battery (100). Step 343 can include partitioning, based on the positions of the first and second tabs (104, 108), a U-shaped conductive path (102) into a first section (114) and a second section (116) by removing a first portion (112) of the U-shaped conductive path (102) and removing a second portion (115) of the U-shaped conductive path (102). Step 344 can include connecting the first section (114) to the first tab (104), and step 345 can include connecting the second section (116) to the second tab (108).

The embodiments shown and described above are only examples. Even though numerous characteristics and advantages of the present technology have been set forth in the foregoing description, together with details of the structure and function of the present disclosure, the disclosure is illustrative only. Changes may be made in the detail, including in matters of shape, size and arrangement of the parts within the principles of the present disclosure up to, and including, the full extent established by the broad general meaning of the terms used in the claims.

The invention claimed is:

1. A method of forming a battery assembly (111), the method comprising:
   obtaining a battery (100) having a first tab (104) electrically connected to a first terminal (106) of the battery (100) and having a second tab (108) electrically connected to a second terminal (110) of the battery (100);
   obtaining a U-shaped conductive path (102);
   determining a position of the first tab (104) and a position of the second tab (108);
   removing a first portion (112) of the U-shaped conductive path (102) to partition the U-shaped conductive path (102) into a first section (114) and a second section (116);
   connecting the first section (114) to the first tab (104); and
   connecting the second section (116) to the second tab (108).

2. The method of claim 1, wherein removing the first portion (112) of the U-shaped conductive path (102) comprises removing the first portion (112) based on the determined positions of the first tab (104) and the second tab (108).

3. The method of claim 1, further comprising removing a second portion (115) of the U-shaped conductive path (102).

4. The method of claim 3, wherein:
   determining a position of the first tab (104) comprises determining a position of an outer side (122) of the first tab (104);
   determining a position of the second tab (108) comprises determining a position of an outer side (124) of the second tab (108);
   connecting the first section (114) to the first tab (104) comprises aligning a first end (118) of the first section (114) with the outer side (122) of the first tab (104); and
   connecting the second section (116) to the second tab (108) comprises aligning a second end (120) of the second section (116) with the outer side (124) of the second tab (108).

5. The method of claim 3, wherein:
   determining a position of the first tab (104) comprises determining a position of an outer side (122) of the first tab (104);
   determining a position of the second tab (108) comprises determining a position of an outer side (124) of the second tab (108);
   connecting the first section (114) to the first tab (104) comprises setting a first end (118) of the first section (114) flush with the outer side (122) of the first tab (104); and connecting the second section (116) to the second tab (108) comprises setting a second end (120) of the second section (116) flush with the outer side (124) of the second tab (108).

6. The method of claim 3, wherein removing a first portion (112) of the U-shaped conductive path (102) comprises removing a first portion (112) along a first line (127) that is a first distance (126) from an inner side (130) of the first tab (104), and wherein removing a second portion (115) of the U-shaped conductive path (102) comprises removing a second portion (115) along a second line (129) that is a second distance (128) from an inner side (132) of the second tab (108).

7. The method of claim 6, wherein the first distance (126) is the same as the second distance (128).

8. The method of claim 1, wherein removing the first portion (112) of the U-shaped conductive path (102) comprises removing the first portion (112) along a line centrally located between an inner side (130) of the first tab (104) and an inner side (132) of the second tab (108).

9. The method of claim 1, wherein removing the first portion (112) of the U-shaped conductive path (102) comprises removing the first portion (112) along a line centrally located between a centerline (138) of the first tab (104), and a centerline of the second tab (108).

10. The method of claim 1, wherein removing the first portion (112) of the U-shaped conductive path (102) comprises removing the first portion (112) along a line formed by an inner side (130) of the first tab (104).

11. The method of claim 10, further comprising removing a second portion (115) of the U-shaped conductive path (102) along a line formed by an inner side (132) of the second tab (108).

12. A battery assembly (111) comprising:
   a first tab (104) electrically connected to a first terminal (106) of a battery (100) and a second tab (108) electrically connected to a second terminal (110) of the battery (100), the first tab (104) and the second tab (108) each having an inner side (130, 132) and an outer side (122, 124); and
   a first conductive path (114) having a first end (118) and a second conductive path (116) having a second end (120), the first and second ends (118, 120) separated by space (113) formed by removing at least one portion (112) of a U-shaped conductive path (102),
   wherein the first conductive path (114) is connected to the first tab (104), and wherein the second conductive path (116) is connected to the second tab (108).

13. The battery assembly (111) of claim 12, wherein the first end (118) of the first conductive path (114) is aligned with the outer side (122) of the first tab (104), and wherein the second end (120) of the second conductive path (116) is aligned with the outer side (124) of the second tab (108).

14. The battery assembly (111) of claim 12, wherein the first end (118) of the first conductive path (114) is flush with the outer side (122) of the first tab (104), and wherein the second end (120) of the second conductive path (116) is flush with the outer side (124) of the second tab (108).

15. The battery assembly (111) of claim 12, wherein the first end (118) is a first distance (126) from the inner side (130) of the first tab (104), and wherein the second end (120) is a second distance (128) from the inner side (132) of the second tab (108).

16. The battery assembly (111) of claim 15, wherein the first distance (126) is the same as the second distance (128).

17. The battery assembly (111) of claim 12, wherein the space (113) is centrally located between the inner side (130) of the first tab (104) and the inner side (132) of the second tab (108).

18. The battery assembly (111) of claim 12, wherein the space (113) overlaps a line midway between the inner side (130) of the first tab (104) and the inner side (132) of the second tab (108).

19. The battery assembly (111) of claim 12, wherein the space (113) overlaps a line midway between a centerline (138) of the first tab (104) and a centerline of the second tab (108).

20. The battery assembly (111) of claim 12, wherein the first end (118) is collinear with the inner side (130) of the first tab (104).

21. The battery assembly (111) of claim 20, wherein the second end (120) is collinear with the inner side (132) of the second tab (108).

22. A battery assembly (111) formed by:
    determining a position of a first tab (104) connected to a first terminal (106) of a battery (100);
    determining a position of a second tab (108) connected to a second terminal (110) of the battery (100);
    partitioning a U-shaped conductive path (102) into a first section (114) and a second section (116), wherein partitioning the U-shaped conductive path (102) comprises removing a first portion (112) of the U-shaped conductive path (102);
    connecting the first section (114) to the first tab (104); and
    connecting the second section (116) to the second tab (108).

23. The battery assembly (111) of claim 22, wherein removing the first portion (112) of the U-shaped conductive path (102) comprises removing the first portion (112) based on the determined positions of the first tab (104) and the second tab (108).

24. The battery assembly (111) of claim 23, wherein partitioning the U-shaped conductive path (102) further comprises removing a second portion (115) of the U-shaped conductive path (102).

* * * * *